July 12, 1932.  J. W. MEIXELL  1,867,086
WEED PULLING DEVICE
Filed July 9, 1931
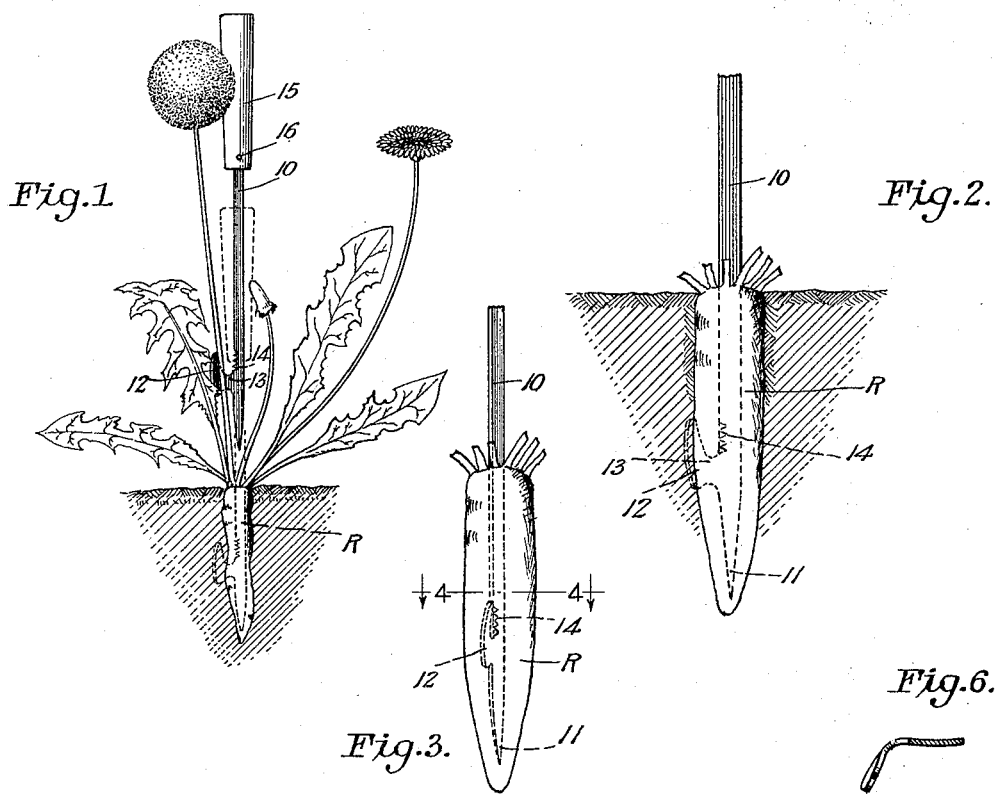
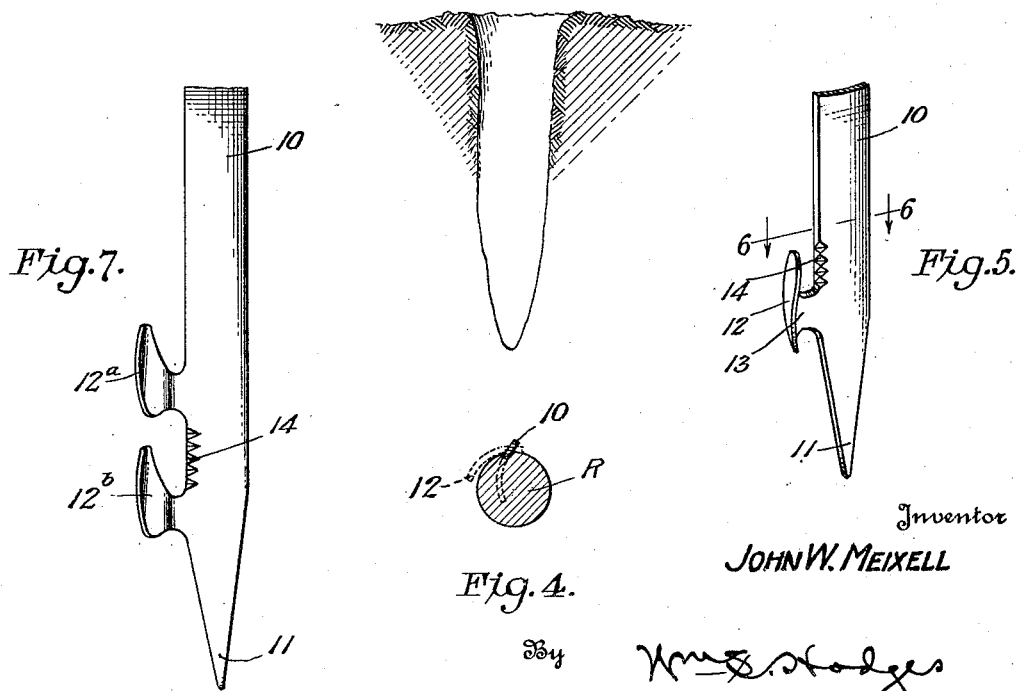
Inventor
JOHN W. MEIXELL
By Wm. S. Hodges
Attorney Patented July 12, 1932

1,867,086

UNITED STATES PATENT OFFICE

JOHN W. MEIXELL, OF LEWISBURG, PENNSYLVANIA

WEED PULLING DEVICE

Application filed July 9, 1931. Serial No. 549,774.

This invention is a weed pulling device designed to pull large roots, such as dandelion and other deep growing roots, but not limited to this particular type of vegetation.

One of the objects of the invention is to provide a hand tool constructed of a single piece of metal capable of being interlocked with a plant root, so that said root may be withdrawn from the ground by a straight longitudinal pull applied to the tool. A further object is to provide a tool of the character described having one or more root engaging ears, offset with respect to the shank of the tool, and so disposed that earth and other foreign material will not pack around and be retained by the joint between the ears and the tool. A further object is to provide a weed pulling device which may be constructed of stamped metal so that it may be manufactured at a minimum cost.

The invention will be hereinafter fully set forth and particularly pointed out in the claims.

In the accompanying drawing:—

Figure 1 is a view illustrating the weed pulling device about to be placed in weed-pulling position. Figure 2 is a similar view with the tool inserted into the ground and about to be engaged with the root. Figure 3 is a view illustrating the positions of the parts as the root is drawn from the ground. Figure 4 is a transverse sectional view on the line 4—4, Figure 3. Figure 5 is a detail perspective view illustrating the tool. Figure 6 is a transverse sectional view on the line 6—6, Figure 5. Figure 7 is a detail view illustrating a slight modification.

Referring to the drawing, 10 designates a tool body which may be of any desired cross sectional contour, but it is preferred to construct it as a flat metal stamping of slightly concavo-convex form in cross section. Said body is provided at its lower end with an earth-penetrating portion having a reduced pointed extremity 11, and extending laterally from said body at a position spaced from said pointed extremity is a root-embracing wing 12. This wing, as shown is slightly curved in a plane approximately parallel with said body 10 and joined thereto by a shank 13, the arrangement being such that the shank extends laterally from the edge of the tool 10, and the body of the wing is turned at an angle into a different vertical plane from that of the shank, so as to project beyond the plane of the convexed curved surface of said body and extends upwardly and outwardly from the tool body, as clearly shown. The edge of the body 10 immediately above the wing 12 is provided with teeth or serrations 14, as clearly shown in the drawing. Any form of handle may be provided, as desired. For the purpose of illustration, a handle 15 is shown as secured to the body 10 by means of rivets or similar securing means indicated at 16. Obviously the wing 12 may be projected from either edge of the tool body.

Although the device has thus far been described as provided with a single wing 12, any number of such wings may be employed. For instance, two longitudinally spaced wings 12a and 12b are shown in Figure 7.

In operation, the tool is held immediately above the root R as indicated in Figure 1, with the forward convexed surface of the tool body positioned to contact with the root R. The tool is then forced downwardly beside the root R, as indicated in Figure 2. The body 10 is then rotated not more than a quarter turn, to the position shown in Figure 4, thereupon establishing a firm interlock between the tool and the root, so that a straight longitudinal pull will withdraw the root, as indicated in Figure 3. In this connection, it will be noted that it is not necessary to dig around the root to loosen it, and that after the root is withdrawn the hole is little larger, if any, than the space originally occupied by the root. From the foregoing it will be noted that a simple form of weed pulling device is provided, the same being constructed of a flat tool body having one edge provided with a laterally extended wing-like member, the upper edge portion of which is blunt and merges into a blunt contiguous edge portion of the body. Said wing-like member also extends upwardly and forwardly from the tool body at an angle to the contiguous edge and to the front face of the tool body, so that said member and the said merging edges provide a non-cutting gripping-and-pulling-recess which firmly engages the root and prevents slipping of the tool with respect thereto when a pulling strain is applied to the tool.

It will also be noted that the teeth 14 serve to add to the interlocking engagement between the tool and the root.

The advantages of the device will be readily understood by those skilled in the art to which it belongs. For instance, an important advantage is that the tool may be made of stamped flat metal, and will possess maximum strength and durability, although it may be manufactured at small cost. It will also be observed that a very simple device has been provided by means of which a firm interlocking engagement may be made with deep-growing roots which will not easily be broken, so that by a straight and continued pull in a longitudinal direction, the root may be easily withdrawn from the ground in its entirety. In fact the weeds can be extracted very easily and rapidly.

Having thus explained the nature of the invention and described an operative manner of constructing and using the same, although without attempting to set forth all of the forms in which it may be made, or all of the forms of its use, what is claimed is:—

1. A weed pulling device of the character described comprising a flat metal blade of concavo-convex form in cross-section, having a pointed extremity, and serrations in one edge thereof adjacent to said extremity, flat curved wings extending laterally, upwardly and forwardly from said body at a position between the curved extremity and said serrations, and a handle secured to said body.

2. A weed pulling device comprising a tool body of concavo-convex cross section provided with a root-embracing wing formed with a reduced shank extending from one edge thereof, said wing being transversely curved in a plane approximately parallel with the tool body and turned at an angle into a different vertical plane with respect thereto, so as to project beyond the plane of the convexed surface thereof, said tool body having an earth-penetrating portion extended below said shank.

3. A weed pulling device comprising a flat tool body having one edge provided with a laterally extended wing-like member having an upper blunt edge portion merging into a contiguous blunt edge portion of said body, said wing-like member being extended upwardly and forwardly from the tool body at an angle to the contiguous edge of said body and also at an angle with respect to the front face of said tool body, so that the wing-like member and said merging edge portions provide a non-cutting gripping-and-pulling recess.

4. A weed pulling device comprising a flat tool body having one edge provided with a flat shank extending laterally therefrom, and a widened wing-like portion integrally connected with said shank, said wing-like portion, said shank and said tool body having merging blunt edge portions, said wing-like member being extended upwardly and forwardly from said shank at an angle to the contiguous edge of the tool body and also at an angle with respect to the front face of the tool body, so that the wing-like member, said shank and said merging blunt edges provide a non-cutting gripping-and-pulling-recess.

5. A weed pulling device comprising a rigid flat tool body of approximately uniform width and pointed at its lower extremity, said body having one edge provided with a laterally extended wing-like member spaced upwardly from said pointed extremity, said wing-like portion having a blunt edge merging into a blunt contiguous edge portion of said body, said wing-like member being extended upwardly and forwardly from the tool body at an angle to the contiguous edge of the tool body and also at an angle with respect to the front face of the tool body, and having a free curved extremity, said wing-like member and said merging edges providing a non-cutting gripping-and-pulling-recess.

6. A weed pulling device comprising a flat tool body having one edge provided with a laterally extended wing-like member having a widened and rounded extremity, said wing-like member having a blunt edge portion merging into a blunt contiguous edge portion of said body, said wing-like member being extended upwardly and forwardly from the tool body at an angle to the contiguous edge thereof and also at an angle with respect to the front face of said tool body, so that the wing-like member and said merging edges provide a non-cutting gripping-and-pulling-recess, the edge of said body contiguous to said wing-like member being provided with serrations.

7. A weed pulling device comprising a flat tool body having one edge provided with a plurality of longitudinally spaced laterally extended wing-like members, each of said wing-like members having a blunt edge portion merging into a contiguous blunt edge portion of said body, each of said wing-like members being extended upwardly and forwardly from the tool body at an angle to the contiguous edge of said body and also at an angle with respect to the front face of said body, so that said wing-like members and said merging edges provide non-cutting gripping-and-pulling-recesses, the lower end of said body being pointed.

In testimony whereof I have hereunto set my hand.

JOHN W. MEIXELL.